United States Patent
Middleburgh et al.

(10) Patent No.: US 11,335,468 B2
(45) Date of Patent: May 17, 2022

(54) FUEL PELLET

(71) Applicant: WESTINGHOUSE ELECTRIC SWEDEN AB, Västerås (SE)

(72) Inventors: Simon Charles Middleburgh, Chester (GB); Mattias Puide, Västerås (SE); Lars Hallstadius, Västerås (SE); Magnus Limbäck, Västerås (SE); Paul Blair, Västerås (SE)

(73) Assignee: Westinghouse Electric Sweden AB, Västerås (SE)

( * ) Notice: Subject to any disclaimer, the term of this patent is extended or adjusted under 35 U.S.C. 154(b) by 0 days.

(21) Appl. No.: 17/253,288

(22) PCT Filed: Jun. 10, 2019

(86) PCT No.: PCT/EP2019/065061
§ 371 (c)(1),
(2) Date: Dec. 17, 2020

(87) PCT Pub. No.: WO2019/243095
PCT Pub. Date: Dec. 26, 2019

(65) Prior Publication Data
US 2021/0272709 A1    Sep. 2, 2021

(30) Foreign Application Priority Data
Jun. 21, 2018   (EP) .................... 18179142

(51) Int. Cl.
*G21C 3/04*     (2006.01)
*C01G 43/025*   (2006.01)
(Continued)

(52) U.S. Cl.
CPC .......... *G21C 3/048* (2019.01); *C01G 43/025* (2013.01); *G21C 3/326* (2013.01); *G21C 21/02* (2013.01)

(58) Field of Classification Search
CPC . G21C 3/62; G21C 3/623; G21C 3/20; G21C 3/28; G21C 3/626; G21C 3/58; G21C 3/04
See application file for complete search history.

(56) References Cited

U.S. PATENT DOCUMENTS 4,401,608 A   8/1983   Smith
5,999,585 A   12/1999  Dehaudt et al.
(Continued)

FOREIGN PATENT DOCUMENTS

JP         9127279 A    5/1997
KR     20180027390 A    3/2018
(Continued)

OTHER PUBLICATIONS

International Search Report issued in corresponding PCT Application No. PCT/EP2019/065061, dated Sep. 17, 2019, pp. 1-2.

*Primary Examiner* — Jack W Keith
*Assistant Examiner* — Joshua C Devorkin
(74) *Attorney, Agent, or Firm* — Murtha Cullina LLP

(57) ABSTRACT

A uranium oxide fuel pellet having an inner region and an outer rim region about the inner region, and that the fuel pellet is cylindrical and the inner region and outer rim region are coaxial cylindrical regions. The outer rim region has an excess of oxygen in comparison to the inner region, wherein high burnup structure (HBS) formation will be suppressed or delayed. Preferably, the excess oxygen is obtained by a chemical treatment by immersing the pellet in hydrogen peroxide ($H_2O_2$) or potassium permanganate ($KMnO_4$) in solution.

14 Claims, 1 Drawing Sheet

(51) Int. Cl.
 *G21C 3/326* (2006.01)
 *G21C 21/02* (2006.01)

(56) References Cited

U.S. PATENT DOCUMENTS

2014/0185730 A1   7/2014  Kim et al.
2017/0271034 A1*  9/2017  Widegren ............... G21C 21/02
2021/0020321 A1*  1/2021  Laho ........................ G21C 3/62

FOREIGN PATENT DOCUMENTS

| WO | 9713252 A1 | 4/1997 |
| WO | 0000985 | 1/2000 |
| WO | 2016037712 A1 | 3/2016 |

* cited by examiner

FUEL PELLET

TECHNICAL FIELD

The present disclosure concerns nuclear fuel for a nuclear reactor, and in particular, a fuel pellet, a fuel rod, a fuel rod assembly, and methods in relation thereto. The nuclear fuel is normally based on $UO_2$, and may contain additives, such as Gd or other burnable absorbers. The nuclear fuel is often made from a powder that is pressed into a fuel pellet and then sintered.

BACKGROUND

In order to improve the properties of the nuclear fuel it is also known to add other additives, such as Cr, Al and Fe (normally in the form of oxides). Such additives are added to the powder before pressing and sintering the pellets. The purpose of such additives is to improve the properties of the nuclear fuel pellet. In particular, such additives will increase the grain size in a nuclear fuel pellet, which may be beneficial for example in view of so-called PCI (Pellet Cladding Interaction).

Another phenomenon that is known within this field is that when the nuclear fuel has been used for a longer time in a nuclear reactor (i.e. a high burn-up), a new restructured configuration appears at the outer thin region of the fuel pellet. This new structure is often called high burn-up structure (HBS) or rim-structure. As an explanation of this phenomenon it is referred to an article from Materials Today (December 2010) where this phenomenon is explained. The rim-structure is disadvantageous for the nuclear fuel which is discussed in the article. In the following some relevant parts of the article is further discussed.

During its operating life in the core of a nuclear reactor nuclear fuel is subjected to significant restructuring processes determined by neutron irradiation directly through nuclear reactions and indirectly through the thermo-mechanical conditions established as a consequence of such reactions. In today's light water reactors, starting after ~4 years of operation the cylindrical $UO_2$ fuel pellet undergoes a transformation that affects its outermost radial region. The discovery of a newly forming structure necessitated the answering of important questions concerning the safety of extended fuel operation and still today poses the scientific challenge of fully understanding the microstructural mechanisms responsible for its formation.

Nuclear fission is the main energy generating process in the fuel of a nuclear power plant. Most of the fission energy is released as kinetic energy of the fission fragments. During their travel inside the fuel (~8 μm), the fission fragments transfer their energy to neighboring atoms mainly by electronic and nuclear energy loss mechanisms. These highly energetic fission fragments generate thermal spikes due to highly inelastic (excitation and ionization) energy losses along their paths within the fuel. Additionally, atoms knocked out of their lattice positions during direct collisions, in turn, affect other atoms, creating collisions and displacement cascades in the material. These processes generate heat, which is transferred out of the fuel and used to produce electricity, or for other applications. After a few years of irradiation in a nuclear reactor, each atom in the fuel has experienced a few thousand displacements from its initial lattice position. In Light Water Reactors (LWR) during normal operation the fuel is subjected to ~1 displacement per atom (dpa) per day.

Most displaced atoms return to a normal lattice position; however, some defects do not recombine, causing an accumulation of point and extended defects in the fuel. In addition to microstructural defects caused by radiation damage, thermal stresses induced by temperature gradients in the fuel cause macroscopic cracking.

The fission process affects not only the physical state of the fuel, but also its chemistry: the fission products are new elements generated inside the fuel. Accommodating the newly formed species within the fluorite lattice of uranium dioxide is a complex process. Fission, however, is not the only event which causes a modification to the chemical composition of the fuel. Neutron absorption in uranium nuclei and subsequent decay events results in the production of transuranium elements like neptunium, plutonium, americium and curium. These elements play a major role in the nuclear fuel cycle.

Due to the configuration of the neutron energy spectrum in LWR, there is a higher density of epithermal neutron resonance absorption in $^{238}U$ nuclei at the radial outer edge, or rim, of the $UO_2$ fuel pellet, which results in a local enrichment in fissile plutonium via neptunium decay and thus in higher local fission density. The local burn-up at the rim of the $UO_2$ pellet can be 2-3 times higher than the average pellet burn-up, depending on the specific irradiation conditions. During in-pile irradiation, starting at local burn-up around ~50 GWd/tHM (inset, Nuclear Fission) and at irradiation temperature below ~1373 K the fuel undergoes a restructuring process, which results in the appearance of a new fuel morphology; at a local burn-up of ~75 GWd/tHM the fuel appears fully transformed. The new structure, called High Burn-up Structure (HBS) is characterized by grain subdivision and redistribution of fission gases and extended defects. The original grains, with a typical size of around 10 μm, subdivide by a factor of ~10 into sub-micron grains with a size of about 0.1-0.3 μm. The fission gas is released from the fuel matrix and is retained in a high concentration of micron-sized intergranular closed pores; reported values for the porosity fraction in the HBS can exceed 20%. The microstructure of the subdivided grains appears free of extended defects. This restructuring affects a thin region of the fuel pellet, initially a few μm thick, extending inwards with increasing burn-up. The diameter of LWR fuel pellets is of the order of ~9.6-9.7 mm. The HBS structure is also observed in Mixed U—Pu OXide (MOX) fuel, in Pu-rich islands where fission density and the corresponding local burn-up exceed the HBS formation threshold. Additionally, grain subdivision morphology has been reported in U—Mo alloy fuel and fast reactor U—Pu oxide, carbide and nitride fuels.

Also in the patent literature the above HBS phenomenon has been discussed and below some background documents are presented.

WO 97/13252 A1 describes the HBS problem. The document describes that this problem can be solved by providing an excess of O. The excess of O is achieved by adding an oxide. However, the oxide is added to the powder before sintering and the excess of O is thus added to the whole pellet.

US 2014/0185730 A1 describes nuclear fuel that is made to comprise microcells in order to restrain fission products and reduce PCI problems. The document also mentions that excess O may exist, which may react with metallic particles.

U.S. Pat. No. 5,999,585 describes nuclear fuel which should be able to retain fission products. This is achieved by adding a metal in order to trap O by forming an oxide. The nuclear fuel may thus include excess O.

WO 00/00985 A1 discloses a uranium oxide fuel pellet comprising an inner region and an outer region around the inner region, wherein niobia is added to the outer portion of the nuclear fuel pellet. The HBS problem is not discussed.

JP 9127279 A describes that the grain size is increased in only an outer part of the pellet. The abstract describes how the pellets may be produced. Excess oxygen is added before sintering as $U_3O_8$ to aid grain growth.

And finally, U.S. Pat. No. 4,401,608 describes that the grain size in nuclear fuel may be increased by adding a solution of hydrogen peroxide. However, this solution is added to the powder prior to pressing and sintering.

The present invention is concerned with the problem of avoiding or reducing the HBS, and the object of the present invention is to improve the capabilities of avoiding or reducing HBS.

SUMMARY

In a first aspect of the present invention, a uranium oxide fuel pellet is provided that comprises an inner region and an outer rim region about the inner region. The fuel pellet is cylindrical and the inner region and outer rim region are coaxial cylindrical regions. The outer rim region has an excess of oxygen in comparison to the inner region, wherein high burnup structure (HBS) formation will be suppressed or delayed.

In one embodiment the excess of oxygen is obtained by adding oxygen only to the outer rim region of the pellet.

In a further embodiment the excess oxygen is obtained by a chemical treatment by immersing the pellet in hydrogen peroxide ($H_2O_2$), or in potassium permanganate ($KMnO_4$), in solution.

Preferably the outer rim region has a maximum thickness of 100 μm, and the excess oxygen in the outer rim region of the pellet is 5% extra O, by molar content.

According to a further improvement, preferably applied in combination to the fuel pellet provided with an excess of oxygen in the outer region as described above, an oxide coating is provided on the inside of a cladding tube (the nuclear fuel pellets are positioned inside cladding tubes). By providing such an oxide coating on the inner surface of the cladding tube, oxygen in the nuclear fuel pellet is prevented from leaving the pellet in order to form $ZrO_2$ (the cladding tube is normally made of a Zr-alloy which means that $ZrO_2$ may be formed). The oxidation of the inner surface of the cladding tube may be achieved by heating the cladding tube in air with an oxygen torch or by a similar treatment as mentioned above (immersion in $H_2O_2$ or $KMnO_4$) in relation to the fuel pellet.

An another embodiment a fuel rod assembly is provided that comprises a plurality of fuel rods of the kind that has been described above, that in turn comprises fuel pellets having an outer rim region with an excess of oxygen in comparison to the inner region.

In a second aspect the invention relates to a method of preparing a uranium oxide fuel pellet that comprises an inner region and an outer rim region about the inner region, and that the fuel pellet is cylindrical and the inner region and the outer rim region are coaxial cylindrical regions. The method comprises providing an excess of oxygen in the outer rim region in comparison to the inner region, wherein high burnup structure (HBS) formation will be suppressed or delayed.

Preferably, the method comprises immersing the pellet in hydrogen peroxide ($H_2O_2$), or in potassium permanganate ($KMnO_4$), in solution for obtaining the excess oxygen by a chemical treatment.

The adding of the excess oxygen is performed after the pellet has been formed and ground.

In one embodiment a method is provided to be applied in relation of a fuel rod comprising a plurality of uranium fuel pellets that were obtained by the method described above. The method in relation to the fuel rod comprises providing a cladding tube in which the fuel pellets are intended to be packed in axial alignment, and providing an oxide coating at the inner surface of the cladding tube. Preferably, the oxide coating is achieved by a chemical treatment by immersing the cladding tube in hydrogen peroxide ($H_2O_2$) or potassium permanganate ($KMnO_4$) in solution.

Thus, according to the present invention the excess oxygen is added after sintering to specifically aid preventing HBS formation and not changing the grain size which would happen in the sintering furnace.

As discussed above in the background section the high burnup structure (HBS) is related to the fact that defects or dislocations build-up. The present invention is based on the insight that if the kinetics within the outer rim region of the nuclear fuel pellet is increased, then the HBS will be suppressed or delayed. The kinetics within the rim region is improved, according to the present invention, by increasing the hyperstoichiometry in the outer rim region of the pellet.

By providing an excess of oxygen in the outer region of the pellet, this outer region will not only contain $UO_2$, but rather $UO_{2+x}$. By providing this excess of oxygen, the kinetics is increased and the HBS is reduced.

DETAILED DESCRIPTION

The uranium oxide fuel pellet, the fuel rod, the fuel rod assembly and the method will now be described in detail with references to the appended figures. Throughout the figures the same, or similar, items have the same reference signs. Moreover, the items and the figures are not necessarily to scale, emphasis instead being placed upon illustrating the principles of the invention.

Figure 1:
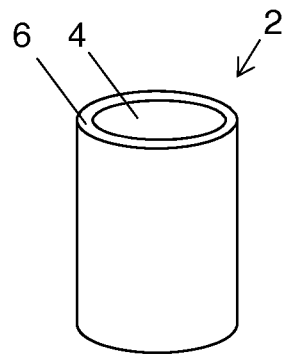
FIG. 1 is a perspective view of a fuel pellet according to the present invention.
Figure 2:
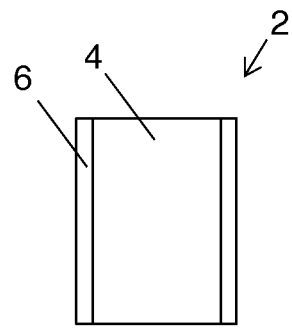
FIG. 2 is a cross-sectional view along a longitudinal axis of the fuel pellet according to the present invention.
Figure 3:
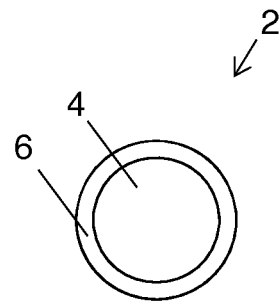
FIG. 3 is a cross-sectional view perpendicular to the longitudinal axis of the fuel pellet according to the present invention.

With references to FIGS. 1-3 showing schematic illustrations of various views of a uranium oxide fuel pellet 2 the present invention will now be described in detail.

The fuel pellet 2 comprises an inner region 4 and an outer rim region 6 about the inner region 4. The fuel pellet 2 is cylindrical and the inner region 4 and the outer rim region 6 are coaxial cylindrical regions. The outer rim region 6 has an excess of oxygen in comparison to concentration of oxygen in the inner region 4, wherein high burnup structure (HBS) formation in the outer rim region will thereby be suppressed or delayed.

Preferably, the outer rim region 6 has a maximum thickness of 100 μm.

The excess of oxygen is obtained by adding oxygen only to the outer rim region 6 of the pellet, and the excess oxygen is approximately 5% extra O, by molar content.

The addition of the oxygen is performed after the pellet has been formed, e.g. sintered, and ground.

In one embodiment the excess oxygen is obtained by a chemical treatment by immersing the pellet in hydrogen peroxide ($H_2O_2$) in solution.

In another embodiment the excess oxygen is obtained by a chemical treatment by immersing the pellet in potassium permanganate ($KMnO_4$) in solution. $KMnO_4$ is a strong oxidizing agent. After the chemical treatment the outer rim region 6 will not only contain $UO_2$, but rather $UO_{2+x}$.

The concentration of hydrogen peroxide or potassium permanganate in solution is preferably higher than 25 millimolar (mM), i.e. 25 mM/litre water.

The temperature of the solution is within the range of 15 to 80° C.

Also other substances being strong oxidizing agents may be considered in order to achieve the excess of oxygen in the outer rim region. Examples include oxygen gas (possibly diluted in an inert gas), other permanganate solutions, and $NO_x$ gas.

The time duration of the immersion of the pellets in the solution varies considerably in dependence of various conditions, but according to some non-limiting examples typical time durations may be in the range of 5-15 minutes, e.g. 10 minutes, in 10% hydrogen peroxide solution at 50 degrees Celsius. The times, temperature and solution molarity can be varied to provide the ideal excess oxygen cross section through the radius of the pellet.

As an alternative, excess oxygen can be added through exposure to oxidizing gases such as $O_2$ or $NO_x$, releasing oxygen into the $UO_2$ rim. Although possible, the low temperature solution methods provide a more controllable reaction compared to the potentially spontaneous gaseous methods.

Figure 4:
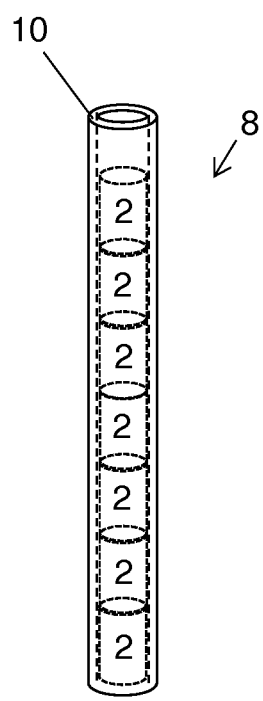
FIG. 4 is a schematic perspective view of a fuel rod according to the present invention.

The present invention also relates to a fuel rod 8 (see the schematic illustration in FIG. 4) that comprises a plurality of uranium fuel pellets 2 of the kind that has been described above. Conventionally the fuel rod comprises a cladding tube in which the fuel pellets are packed in axial alignment.

In one embodiment the cladding tube 10, in which the fuel pellets are packed in axial alignment, is at its inner surface provided with an oxide coating, and that the oxide coating is obtained by a chemical treatment by immersing the cladding tube in hydrogen peroxide ($H_2O_2$) or potassium permanganate ($KMnO_4$) in solution.

In another variation the oxide coating instead is achieved by heating the cladding tube in air or a controlled oxygen containing atmosphere with an oxygen torch. Depth and adhesion of the oxide layer can be tailored by altering the gaseous composition, speed to the torch and temperature of the torch.

Figure 5:
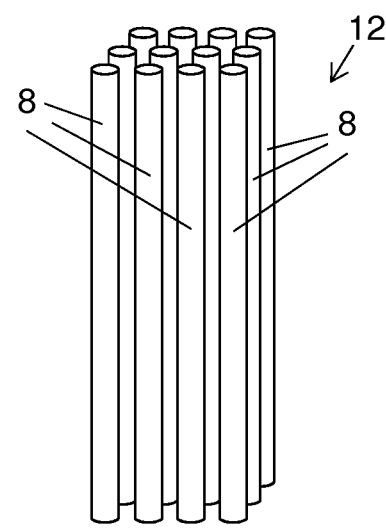
FIG. 5 is a schematic perspective view of a fuel rod assembly according to the present invention.

In FIG. 5 is illustrated a fuel rod assembly 12 that comprises a plurality of fuel rods 8 of the type that has been described above, i.e. fuel rods provided with fuel pellets having an outer rim region having an excess of oxygen in comparison to the oxygen concentration of an inner region. The fuel rod also comprises a cladding tube that preferably at its inner surface is provided with an oxide coating as described above. The illustrated fuel rod assembly 12 has an essentially square cross-section, but other cross-sectional shapes could naturally also be used, e.g. circular.

The present invention also relates to a method of preparing a uranium oxide fuel pellet comprising an inner region and an outer rim region about the inner region, and that the fuel pellet is cylindrical, and the inner region and the outer rim region are coaxial cylindrical regions. The method comprises providing an excess of oxygen in the outer rim region in comparison to the inner region, wherein high burnup structure (HBS) formation will be suppressed or delayed. The step of obtaining the excess oxygen is achieved by adding oxygen only to the outer rim region of the pellet.

In one embodiment the method comprises immersing the pellet in hydrogen peroxide ($H_2O_2$) in solution for obtaining the excess oxygen by a chemical treatment.

In another embodiment the method comprises immersing the pellet in potassium permanganate ($KMnO_4$) in solution for obtaining the excess oxygen by a chemical treatment.

The concentration of hydrogen peroxide or potassium permanganate in solution is preferably higher than 25 millimolar (mM), i.e. 25 mM/litre water.

The temperature of the solution is within the range of 15 to 80° C.

According to a further embodiment a method is provided in relation to a fuel rod comprising a plurality of uranium fuel pellets as described above and intended to be packed in axial alignment in a cladding tube.

In one embodiment the method comprises providing an oxide coating at the inner surface of the cladding tube, and preferably, the method comprises obtaining the oxide coating by a chemical treatment by immersing the cladding tube in hydrogen peroxide ($H_2O_2$) or potassium permanganate ($KMnO_4$) in solution.

In another embodiment the method comprises providing the oxide coating by heating the cladding tube in air with an oxygen torch.

The present invention is not limited to the above-described preferred embodiments. Various alternatives, modifications and equivalents may be used. Therefore, the above embodiments should not be taken as limiting the scope of the invention, which is defined by the appending claims.

What is claimed is:

1. A uranium oxide fuel pellet comprising an inner region and an outer rim region about the inner region, and that the fuel pellet is cylindrical and the inner region and outer rim region are coaxial cylindrical regions, wherein the outer rim region has an excess of oxygen in comparison to the inner region, wherein high burnup structure (HBS) formation will be suppressed or delayed, and wherein said excess oxygen in the outer rim region of the pellet is 5% extra O, by molar content.

2. The uranium oxide fuel pellet according to claim 1, wherein the excess of oxygen is obtained by adding oxygen only to the outer rim region of the pellet.

3. The uranium oxide fuel pellet according to claim 1, wherein the excess oxygen is obtained by a chemical treatment by immersing the pellet in hydrogen peroxide (H2O2) in solution.

4. The uranium oxide fuel pellet according to claim 1, wherein the excess oxygen is obtained by a chemical treatment by immersing the pellet in potassium permanganate (KMnO4) in solution.

5. The uranium oxide fuel pellet according to claim 1, wherein the outer rim region has a maximum thickness of 100 μm.

6. A fuel rod comprising a cladding tube in which a plurality of uranium fuel pellets according to claim 1 are packed in axial alignment.

7. The fuel rod according to claim 6, wherein the cladding tube is at its inner surface provided with an oxide coating, and wherein said oxide coating is obtained by a chemical treatment by immersing the cladding tube in hydrogen peroxide (H2O2) or potassium permanganate (KMnO4) in solution.

8. A fuel rod assembly comprising a plurality of fuel rods according to claim 6.

9. A method of preparing a uranium oxide fuel pellet comprising an inner region and an outer rim region about the inner region, and that the fuel pellet is cylindrical and the inner region and the outer rim region are coaxial cylindrical regions, wherein the method comprises providing an excess of oxygen in the outer rim region in comparison to the inner region, wherein high burnup structure (HBS) formation will be suppressed or delayed, and wherein said excess oxygen in the outer rim region of the pellet is 5% extra O, by molar content.

10. The method according to claim 9, comprising immersing the pellet in hydrogen peroxide (H2O2) in solution for obtaining the excess oxygen by a chemical treatment by.

11. The method according to claim 9, comprising immersing the pellet in potassium permanganate (KMnO4) in solution for obtaining the excess oxygen by a chemical treatment.

12. The method according to claim 9, comprising adding the excess oxygen after the pellet has been formed and ground.

13. A method in relation of a fuel rod comprising a plurality of uranium fuel pellets obtained by the method according to claim 9, and providing a cladding tube in which said fuel pellets are intended to be packed in axial alignment, and wherein the method comprises providing an oxide coating at the inner surface of the cladding tube.

14. The method according to claim 13, comprising providing the oxide coating by a chemical treatment by immersing the cladding tube in hydrogen peroxide (H2O2) or potassium permanganate (KMnO4) in solution.

* * * * *